(12) United States Patent
Neuwirth

(10) Patent No.: US 10,592,898 B2
(45) Date of Patent: *Mar. 17, 2020

(54) OBTAINING A SIGNATURE FROM A REMOTE USER

(71) Applicant: Volker Neuwirth, Eden, UT (US)

(72) Inventor: Volker Neuwirth, Eden, UT (US)

(73) Assignee: Zukunftware, LLC, Eden, UT (US)

( * ) Notice: Subject to any disclaimer, the term of this patent is extended or adjusted under 35 U.S.C. 154(b) by 1056 days.

This patent is subject to a terminal disclaimer.

(21) Appl. No.: 13/731,942

(22) Filed: Dec. 31, 2012

(65) Prior Publication Data

US 2014/0074711 A1 Mar. 13, 2014

Related U.S. Application Data

(60) Provisional application No. 61/700,250, filed on Sep. 12, 2012.

(51) Int. Cl.
*G06Q 20/38* (2012.01)
*G06Q 20/04* (2012.01)
*G06Q 20/40* (2012.01)
*G06Q 20/42* (2012.01)

(52) U.S. Cl.
CPC ..... *G06Q 20/3825* (2013.01); *G06Q 20/0425* (2013.01); *G06Q 20/4014* (2013.01); *G06Q 20/42* (2013.01)

(58) Field of Classification Search
CPC ............... G06Q 20/3825; G06Q 20/42; G06Q 20/4014; G06Q 20/0425
USPC .......................................................... 705/44
See application file for complete search history.

(56) References Cited

U.S. PATENT DOCUMENTS

| 6,018,724 A * | 1/2000 | Arent .................... G06F 21/645 |
| | | 705/39 |
| 6,091,835 A | 7/2000 | Smithies |
| 6,304,915 B1 | 10/2001 | Nguyen et al. |
| 7,934,098 B1 | 4/2011 | Hahn |

(Continued)

FOREIGN PATENT DOCUMENTS

| DE | 202012100620 U1 | 6/2012 |
| WO | 2007128131 A1 | 11/2007 |
| WO | 2010096245 | 8/2010 |

OTHER PUBLICATIONS

"Riivari, Jukka, "Mobile banking: A powerful new marketing and CRM tool for financial services companies all over Europe", Sep. 2005, Journal of Financial Services Marketing 10, p. 11" (Year: 2005).*

(Continued)

*Primary Examiner* — Eric T Wong
*Assistant Examiner* — Kevin T Poe
(74) *Attorney, Agent, or Firm* — Kirton McConkie; Brian Tucker

(57) ABSTRACT

The present invention is directed to receiving a signature (or other type of verification or confirmation) from a remote user. The present invention enables a merchant to send a signature request over a network to any device having a browser and touch screen or other means for receiving user input. An input area is displayed within the browser on the user's device. When the user inputs a signature, the signature can be routed over a network back to the merchant to provide authorization for a transaction.

20 Claims, 12 Drawing Sheets

(56) References Cited

U.S. PATENT DOCUMENTS

| | | | |
|---|---|---|---|
| 2002/0099609 A1* | 7/2002 | Nascenzi | G06Q 20/202 705/21 |
| 2002/0156685 A1* | 10/2002 | Ehrlich et al. | 705/26 |
| 2003/0138135 A1* | 7/2003 | Chung et al. | 382/119 |
| 2004/0201751 A1 | 10/2004 | Bell et al. | |
| 2005/0246263 A1* | 11/2005 | Ogg | G06Q 40/04 705/37 |
| 2006/0064373 A1 | 3/2006 | Kelley | |
| 2006/0212407 A1* | 9/2006 | Lyon | 705/71 |
| 2007/0022053 A1* | 1/2007 | Waserstein et al. | 705/42 |
| 2007/0078797 A1 | 4/2007 | Won | |
| 2008/0065546 A1 | 3/2008 | Ramachandran | |
| 2008/0222049 A1 | 9/2008 | Loomis et al. | |
| 2009/0171839 A1* | 7/2009 | Rosano et al. | 705/40 |
| 2010/0241565 A1* | 9/2010 | Starai et al. | 705/44 |
| 2010/0257612 A1 | 10/2010 | McGuire et al. | |
| 2010/0280946 A1 | 11/2010 | Batten | |
| 2011/0093777 A1 | 4/2011 | Dunn | |
| 2012/0005038 A1* | 1/2012 | Soman | G06Q 20/12 705/26.41 |
| 2012/0011066 A1* | 1/2012 | Telle et al. | 705/44 |
| 2012/0078791 A1 | 3/2012 | Huang et al. | |
| 2012/0142403 A1* | 6/2012 | Prather et al. | 463/13 |
| 2012/0221470 A1* | 8/2012 | Lyon | 705/44 |
| 2012/0239417 A1* | 9/2012 | Pourfallah | G06Q 50/22 705/2 |
| 2012/0253978 A1 | 10/2012 | Bishop et al. | |
| 2012/0311706 A1 | 12/2012 | Newman | |
| 2013/0013227 A1 | 1/2013 | Ajay et al. | |
| 2013/0132274 A1* | 5/2013 | Henderson et al. | 705/41 |
| 2014/0012757 A1* | 1/2014 | Henderson et al. | 705/44 |
| 2014/0040125 A1* | 2/2014 | Kunz et al. | 705/41 |

OTHER PUBLICATIONS

Kang Inwon, Lee Kun Chang, Kim Sang-Man, Lee Jiwon, "THe effect of trust transference in multi-banking channels;, offline, online and mobile", International Journal of Mobile Communications vol. 9, No. 2, 2011, p. 103 (Year: 2011).*

"Sumanjeet, Singh, "Emergence of Payment Systems in the Age of Electronic Commerce: The State of Art", Asia Pacific Journal of Finance and Banking Research vol. 3 No. 3 2009" (Year: 2009).*

International Search Report for WO/2014/105702 (PCT/US13/76939) dated Mar. 13, 2014.

International Preliminary Report on Patentability for WO/2014/042911 (PCT/US13/57859) dated Sep. 12, 2014.

* cited by examiner

200

| First Name: | | Last Name: | |

| Routing #: | | Account #: | |
| Check #: | | Type: Savings ◉ Checking ◉ | 201

| Amount: | |

202
| Mobile #: | | Email: | | 203

204 — Request Signature

FIG. 2

200 http://somewebsite.com

First Name: ☐  Last Name: ☐

Routing #: ☐  Account #: ☐  } 201

Check #: ☐  Type:  Savings ◉  Checking ◉

Amount: ☐

202 ⌐  203 ⌐

Mobile #: ☐  Email: ☐

204 ⌐ [Request Signature]

John Doe  1001
123 N Street  DATE _____
City, State 12345

Pay _____ $ ☐  ⌐ 501
TO THE ORDER OF

For _____

123456789  000123456789  1001

⌐ 502
[Process eCheck]

FIG. 5

200 http://somewebsite.com

First Name: [        ]  Last Name: [        ]  ⎫
                                                ⎪
CC #: [        ]  Expiration: [        ]        ⎬ 201
CCV2 #: [        ]                              ⎪
                                                ⎪
Amount: [        ]                              ⎭

202 ⌐                    203 ⌐

Mobile #: [        ]     Email: [        ]

┌─ 601                              204 ⌐  [Request Signature]

┌─────────────────────────┐
│      Company A          │
│ 12/31/2012   12:41 PM   │
│                         │
│ For: ...                │
│                         │
│ TOTAL          $60.64   │
│                         │
│ *AMEX*              │
│ XXXX XXXX XXXX 7890     │
│ 12/12                   │
│ ┌─ Signature ─────────┐ │      [Process Credit Card]
│ │                     │ │                    ⌐ 602
│ └─────────────────────┘ │
└─────────────────────────┘

FIG. 6

200 http://somewebsite.com

First Name: [ ]  Last Name: [ ]

Routing #: [ ]  Account #: [ ]  } 201

Check #: [ ]  Type:  Savings ⊙  Checking ⊙

Amount: [ ]

202 ⌐  203 ⌐

Mobile #: [ ]  Email: [ ]

204 ⌐ [Request Signature]

John Doe                                    1001
123 N Street                    DATE_____
City, State 12345
                                                            501
Pay _____ $ [    ]
TO THE ORDER OF 502
For _____  *Signature: John Doe*
                                                      [Process
123456789  000123456789  1001                  eCheck]

FIG. 7

200 http://somewebsite.com

First Name: [      ]  Last Name: [      ]  ⎫
                                          ⎬ 201
CC #: [      ]  Expiration: [      ]      ⎪
CCV2 #: [      ]                          ⎪
                                          ⎭
Amount: [      ]

202 ⌐                    203 ⌐
Mobile #: [      ]       Email: [      ]

601
                                    204 ⌐  [Request Signature]
Company A
12/31/2012    12:41 PM For: ...

TOTAL              $60.64

*AMEX*
XXXX XXXX XXXX 7890
12/12

┌ Signature ─────────┐
│    John Doe        │
└────────────────────┘
                                        [Process Credit Card]
                                                    ⌐ 602

FIG. 8

OBTAINING A SIGNATURE FROM A REMOTE USER

CROSS-REFERENCE TO RELATED APPLICATIONS

This application claims priority to U.S. Provisional Patent Application No. 61/700,250 which was filed on Sep. 12, 2012.

BACKGROUND

Mobile computing devices such as smart phones and tablets are becoming commonplace in today's world. Such devices enable users to perform transactions in virtually any location. For example, using a smart phone, a user can make online purchases or purchases over the phone from any remote location having an appropriate connection. In many transactions, the user's authorization to enter into a transaction can be received over the phone or by clicking a checkbox in a webpage.

In spite of the mobility provided by such devices, many transactions still cannot be performed by a remote user. Some transactions (e.g. recurring payments) often cannot be completed without receiving a signature from the user. For this reason, to authorize some transactions, remote users are required to mail or fax a signed paper to the entity performing the transaction. Examples of transactions that require a user's signature include authorization to make recurring debits from the user's account for repaying a loan or authorization to make recurring charges to a user's credit card for a subscription service.

Printing, signing, and returning a document can be a burdensome requirement for many users. Accordingly, when a signature is required for authorizing a transaction remotely, users are not able to fully benefit from the mobility provided by their portable devices.

BRIEF SUMMARY

The present invention extends to systems, methods, and computer program products for receiving a signature (or other type of verification or confirmation) from a remote user. The present invention enables a merchant to send a signature request over a network to any device having a browser and touch screen or other means for receiving user input. An input area is displayed within the browser on the user's device. When the user inputs a signature, the signature can be routed over a network back to the merchant to provide authorization for a transaction.

In one embodiment, a method for a server system to provide a request for user input to a client computing device over a network includes receiving a request from a merchant computing system. The request requests that a request for user input be sent to a client computing device. The request also includes contact information for a user of the client computing device. The request for user input is then generated and sent to the client computing device using the contact information. User input from the user of the client computing device is received. The user input is then sent to the merchant computing system to enable the merchant computing system to perform a transaction that requires the user input.

In another embodiment, a method for a merchant computing system to request user input from a remote user over a network includes receiving account information and contact information of a user for performing a transaction. A request for user input is then sent to a client computing device of the user to authorize the transaction. The request is sent using the contact information of the user. The user input is received over the network. The transaction is then performed using the account information and the user input.

In another embodiment, a method for a client computing device to remotely provide user input to authorize a transaction includes receiving an electronic message that includes a link to a web page. In response to the selection of the link, a web page is displayed that includes an area for receiving user input from a user via a touch screen of the client computing device. The user input is sent over the internet to a merchant computing system to enable the merchant computing system to perform the transaction using the user input.

This summary is provided to introduce a selection of concepts in a simplified form that are further described below in the Detailed Description. This Summary is not intended to identify key features or essential features of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates an exemplary user interface that can be displayed by a merchant computing system to allow a signature to be requested from a remote user;

FIG. 5 illustrates the user interface of FIG. 2 after it has been updated to include an image of a check;

FIG. 6 illustrates the user interface of FIG. 2 after it has been updated to include an image of a credit card receipt;

FIG. 7 illustrates the user interface of FIG. 5 after a signature has been received;

FIG. 8 illustrates the user interface of FIG. 6 after a signature has been received;

DETAILED DESCRIPTION

Figure 1:
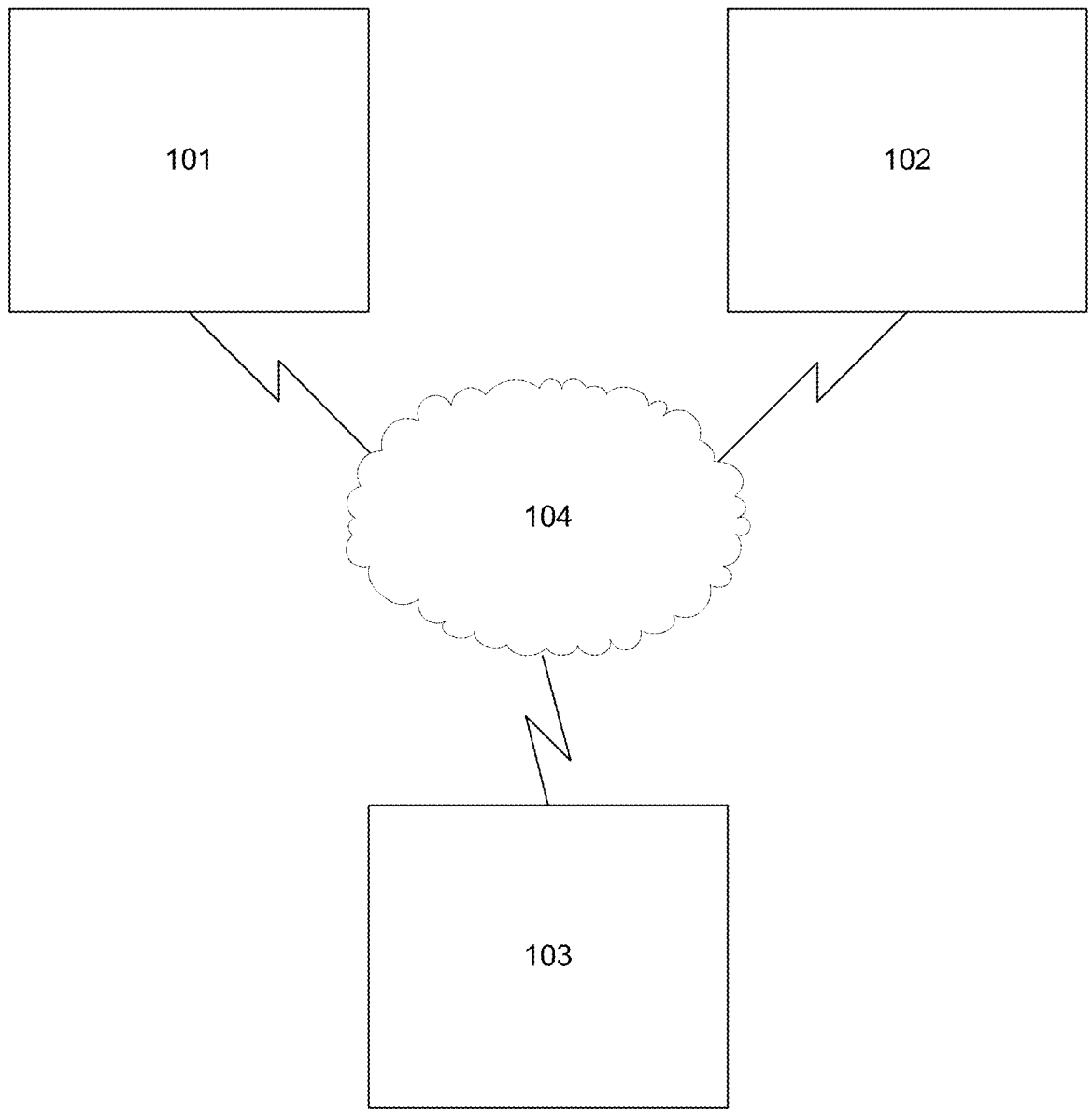
FIG. 1 illustrates an exemplary computer environment in which the present invention can be implemented.

The present invention extends to systems, methods, and computer program products for receiving a signature (or other type of verification or confirmation) from a remote user. The present invention enables a merchant to send a signature request over a network to any device having a browser and touch screen or other means for receiving user input. An input area is displayed within the browser on the user's device. When the user inputs a signature, the signature can be routed over a network back to the merchant to provide authorization for a transaction.

In one embodiment, a method for a server system to provide a request for user input to a client computing device over a network includes receiving a request from a merchant computing system. The request requests that a request for user input be sent to a client computing device. The request also includes contact information for a user of the client computing device. The request for user input is then generated and sent to the client computing device using the contact information. User input from the user of the client computing device is received. The user input is then sent to the merchant computing system to enable the merchant computing system to perform a transaction that requires the user input.

In another embodiment, a method for a merchant computing system to request user input from a remote user over a network includes receiving account information and contact information of a user for performing a transaction. A request for user input is then sent to a client computing device of the user to authorize the transaction. The request is sent using the contact information of the user. The user input is received over the network. The transaction is then performed using the account information and the user input.

In another embodiment, a method for a client computing device to remotely provide user input to authorize a transaction includes receiving an electronic message that includes a link to a web page. In response to the selection of the link, a web page is displayed that includes an area for receiving user input from a user via a touch screen of the client computing device. The user input is sent over the internet to a merchant computing system to enable the merchant computing system to perform the transaction using the user input.

Embodiments of the present invention may comprise or utilize a special purpose or general-purpose computers including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, smart phones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In the following description, the present invention will be described primarily using an example of obtaining a signature from a remote user using a touch screen device. However, it is emphasized that the present invention is not limited to obtaining a signature, but can be used to obtain any type of input from a remote user. Further, the description also primarily describes the use of email or text message for sending requests to a client computing device. However, it is also emphasized that any communication format that allows a link to be included in the message content can equally be used as described below.

FIG. 1 illustrates an exemplary computer environment 100 in which the present invention can be implemented. Computer environment 100 includes server system 101, merchant computing system 102, and client computing device 103 which are each connected via a network 104. In a typical implementation, network 104 comprises the internet although other network connections could be used to interconnect any of the systems of computer environment 100. Client computing device 103 represents any device having a browser and a touch screen or other means for receiving a user's signature. For example, client computing device 103 may comprise a smart phone or tablet with a touch screen that allows a user to use his finger to provide a signature.

Merchant computing system 102 represents one or more servers or other computing devices that a merchant uses to send requests to server system 101 over network 104. These requests can include requests that server system 101 generate and send a signature request to client computing device 103.

Server system 101 represents one or more computing devices used to receive requests from merchant computing system 102, and to send requests for signatures to client computing device 103 and receive signatures back from client computing device 103. Server system 101 can comprise one or more server computing devices or a cloud of server computing systems.

Accordingly, server system 101 acts as an intermediary between merchant computing system 102 and client computing device 103 for requesting and obtaining a signature from a user of client computing device 103. Server system 101 can employ any suitable interface for receiving requests from merchant computing system 102. In one particular embodiment, a Simple Object Access Protocol (SOAP) interface can be provided to allow merchants to make requests for signatures and receive signatures using SOAP requests and responses respectively. In this manner, server system 101 can provide a third party tool for obtaining signatures that is easily incorporated into any merchant's business processes.

FIG. 2 illustrates an exemplary user interface 200 that can be displayed by merchant computing system 102 to an employee to allow the employee to request a signature from a remote user of client computing device 103. For example, the employee may be communicating with the user to establish a subscription or other agreement requiring the user to make recurring (e.g. monthly) payments. Such agreements may require a signature from the user to authorize monthly payment, such as in the form of a monthly ACH debit or credit card charge.

Although this example refers to an employee requesting a signature, the merchant computing system 102 can generate requests automatically. Also, the merchant computing system 102 can request signatures from one or many different remote users (i.e. merchant computing system 102 can make batch requests for signatures). For example, merchant computing system 102 can send a batch request to server system 101 requesting signatures or other user input from many different users.

In prior approaches, the user would provide a signature generally by printing, signing, and returning a form via mail or fax. Such approaches are burdensome. The present invention enables a signature to be quickly and easily obtained from a user by employing server system 101.

User interface 200 represents an embodiment where the merchant is attempting to receive a signature to authorize an ACH debit. Accordingly, user interface 200 includes fields 201 for receiving user information including the user's name, a bank routing number, an account number, a check number, an account type, and an amount. Fields 201 are exemplary of information that may be required for an ACH transaction; however, not all information shown is required in all embodiments of the present invention.

User interface 200 also includes fields 202, 203 for receiving a mobile phone number or an email address for the user. The employee can input either or both the user's phone number or email address. Once input, the employee can select request signature button 204 which causes a request to be sent to server system 101 requesting that a signature request be generated and sent to a client computing device. The signature request sent to the client computing device can be in any format capable of including a hyperlink as described below. For example, the signature request can be a text message, an email, an instant message, or a social networking (e.g. Twitter, Facebook, Google+, etc.) message. Some or all of the information input into fields 201 can also be included in the request sent to server system 101.

Although not shown in FIG. 2, user interface 200 can also provide one or more additional fields for receiving other information such as free form text. Any or all of this information can be included in the request sent to server system 101 for subsequent inclusion in a message sent to a client computing device.

As stated above, the request sent to server system 101 can be in the form of a SOAP request. As such, logic for making the request can be easily incorporated into a merchant's existing systems or included in new systems designed to obtain signatures from a remote user.

When server system 101 receives the request from merchant computing system 102, it can generate a message to send to the user in accordance with the information supplied in the request. For example, if the request indicates a mobile phone number, a text message can be generated, whereas if the request indicates an email address or Facebook username, an email or Facebook communication respectively can be generated. The generated message can include any combination of the information provided in the request received from merchant computing system 102 as well as other information provided by server system 101. For example, the generated message can include free form text provided by merchant computing system 102 that can be displayed to the user of client computing device 103.

Figure 3:
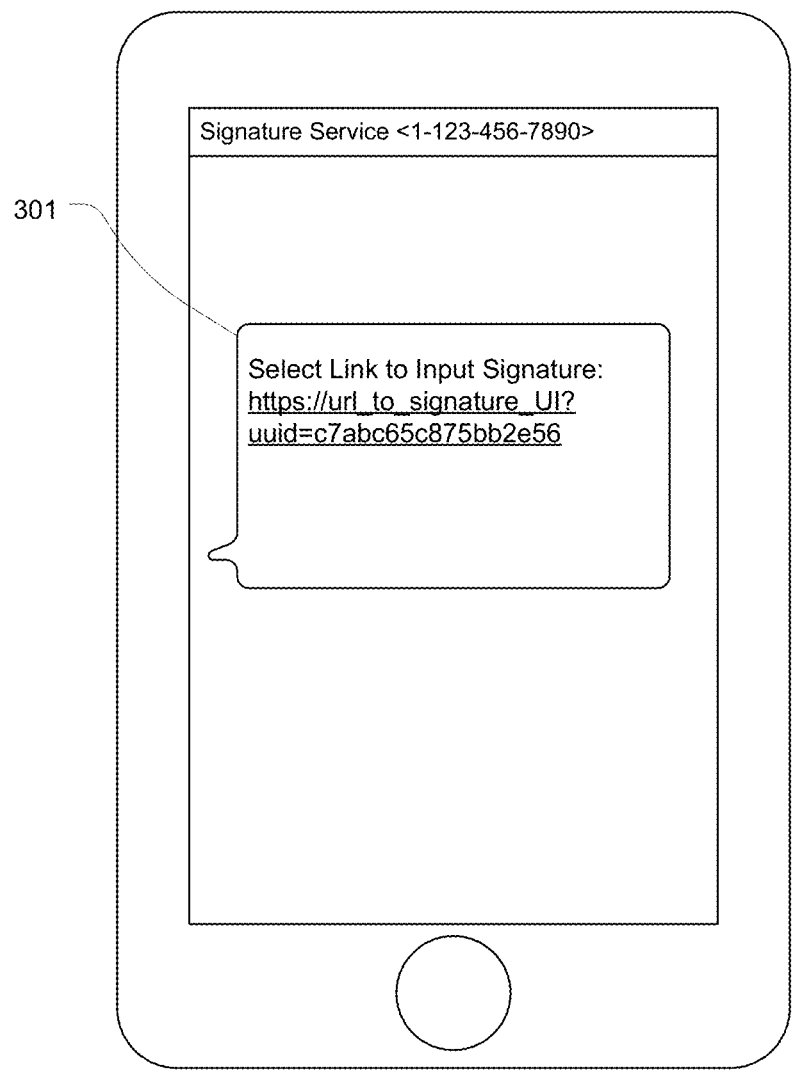
FIG. 3 illustrates an example text message displayed on a smart phone that includes a link to an interface for inputting a signature.

The generated message can include a link to a service for obtaining the signature from the user using client computing device 103. For example, FIG. 3 illustrates an example text message 301 displayed on a smart phone that includes a link that the user can select to receive an interface (e.g. a web page) for inputting a signature. In some embodiments, the message can have an associated expiration time, after which the message can no longer be used to provide a signature (e.g. the link in the message becomes invalid after the expiration time).

Figure 4A:
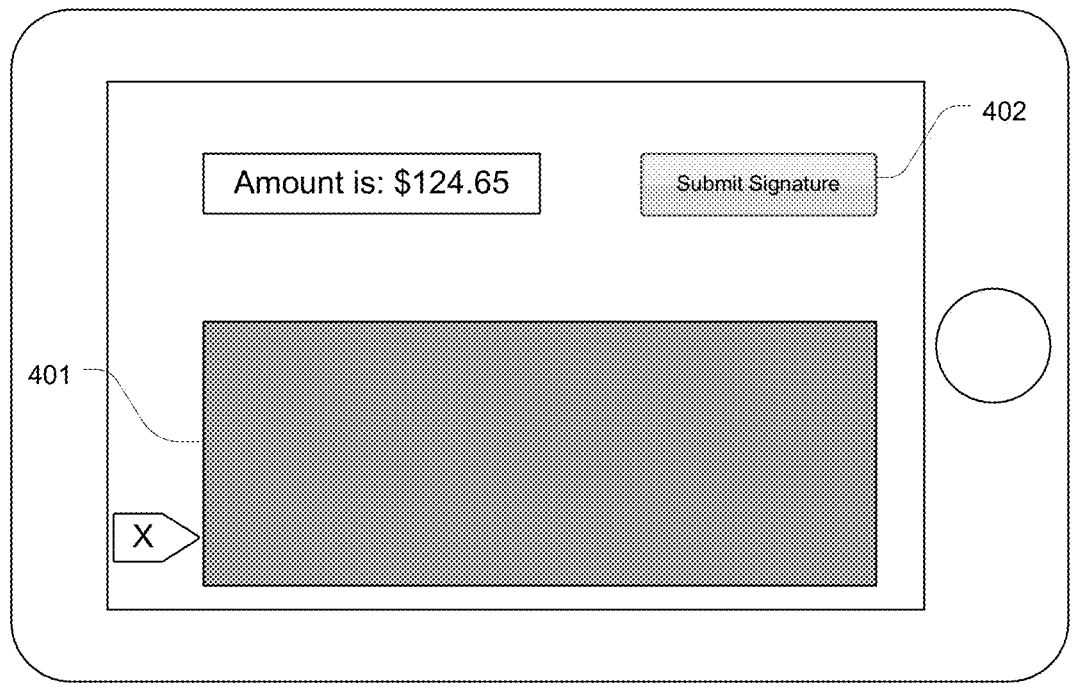
FIGS. 4A-4B illustrate an exemplary user interface that can be displayed on a client computing device to receive a signature from a user.
Figure 4B:
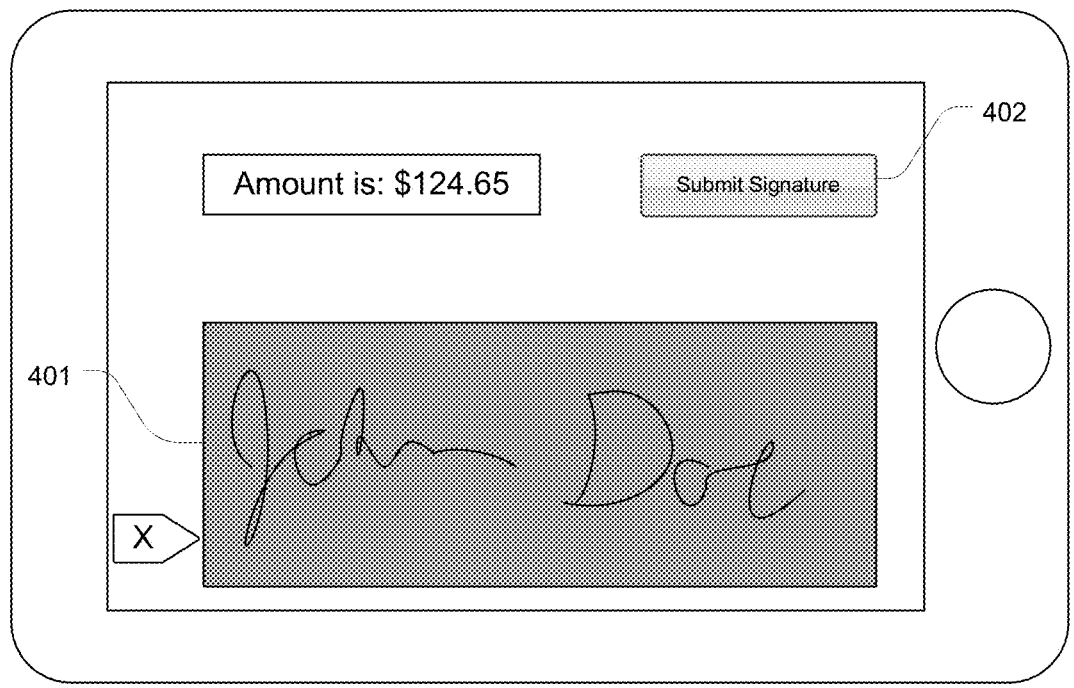

FIG. 4A illustrates a user interface 400 that can be displayed to the user on client computing device 103 to allow the user to input a signature. User interface 400 comprises a signature area 401 in which the user signs his name. In some embodiments, user interface 400 is browser based. Because a browser based approach can be used, client computing device 103 does not need any additional software beyond what is typically included in such devices (e.g. a standard browser) to input a signature. User interface 400 can also include other information beyond what is shown in FIGS. 4A and 4B. For example, user interface 400 can include free form text provided in the request received from merchant computing system 102.

Once the user has input his signature as shown in FIG. 4B, he can select the process button 402 which captures the signature and causes the signature to be sent back to server system 101 which routes the signature back to merchant computing system 102 (e.g. as a SOAP response). In a typical implementation, a user inputs his signature using his finger on the touch screen. However, the user can also input his signature in other ways such as by using a stylus, mouse, or other input device.

Once merchant computing system 102 has received the signature of the user, merchant computing system 102 can route the appropriate information to a third party payment processor (e.g. a clearinghouse). Also, a receipt or other evidence of the submission of the signature/input can be provided back to the client computing device 103 via any communication means (e.g. email, text, social media communication, etc.). This receipt can act as a confirmation to the user that the user provided the requested input.

In some embodiments, user interface 200 can generate a display of a check, credit card receipt, or other instrument to represent a transaction to be performed. For example, FIG. 5 illustrates that user interface 200 has been updated to include an image of a check 501. The image of the check can be generated based on the information input into fields 201. For example, when the employee selects the request signature button 204, the information input into field 201 can be accessed to populate the routing number, account number, check number, etc. into the image of the check.

In some embodiments, the image of the check (or other type of image such as a credit card receipt) can be generated by server system 101 using the information input into field 201, and returned to merchant computing system 102 for display within user interface 200. In this manner, the logic required to implement user interface 200 on merchant computing system 102 can be further simplified, and can even allow user interface 200 to be browser based.

FIG. 6 illustrates user interface 200 when a signature is being requested to authorize a credit card transaction. As shown, user interface includes an image of a credit card receipt 601 that includes a portion of the credit card number, the expiration date, the amount, etc.

FIGS. 7 and 8 illustrate user interface 200 after the signature has been received to authorize a check and credit card transaction respectively. As shown in each figure, the signature has been added to user interface 200 to indicate to the employee that the user's signature has been received, and the transaction is ready to be submitted to the third party payment processor. As shown in FIG. 7, the signature can be added directly to the image of the check on the signature line as if the user had directly signed the check. Similarly, in FIG. 8, the signature is shown as having been added to the receipt. A process eCheck button 502 and a process credit card button 602 can also be provided for submitting the information once a valid signature has been obtained.

Although the above examples of obtaining a signature have related to financial transactions, the present invention can equally be used to obtain a signature for any type of transaction or for any other purpose. For example, the present invention can be used by a courier service such as FedEx or UPS to obtain a signature to authorize a package to be left on a person's doorstep even when the person is not home. Similarly, the present invention can be used to obtain a consent from a user for any other purpose. In other words, with only an identifier of a user (e.g. phone number, email address, social networking identifier, etc.), a merchant can make a request, via server system 101, for a signature for any purpose.

For example, a courier service could use server system 101 to make batch requests for signatures to approve of leaving packages at customers' doors. When an approval is received from a customer, the approval can be routed to a delivery person to inform the delivery person that the corresponding package can be left at the door. Similarly, server system 101 can be used to make batch requests for authorizations to charge customers' accounts for a service. As each authorization is received, the corresponding account can be charged.

Further, although the above description uses the example of obtaining a signature from a user, the present invention can also be used to receive other input from a user. For example, if a merchant requires that a user input a pin or other confirmation input, the present invention can be used to send a request for such input. In such cases, rather than (or in addition to) displaying signature area 401 when the user selects the link on client computing device 103, another area can be displayed for receiving the desired input (e.g. a form for entering a password, pin, or other identifier, or a button or other UI element for providing confirmation).

Figure 9:
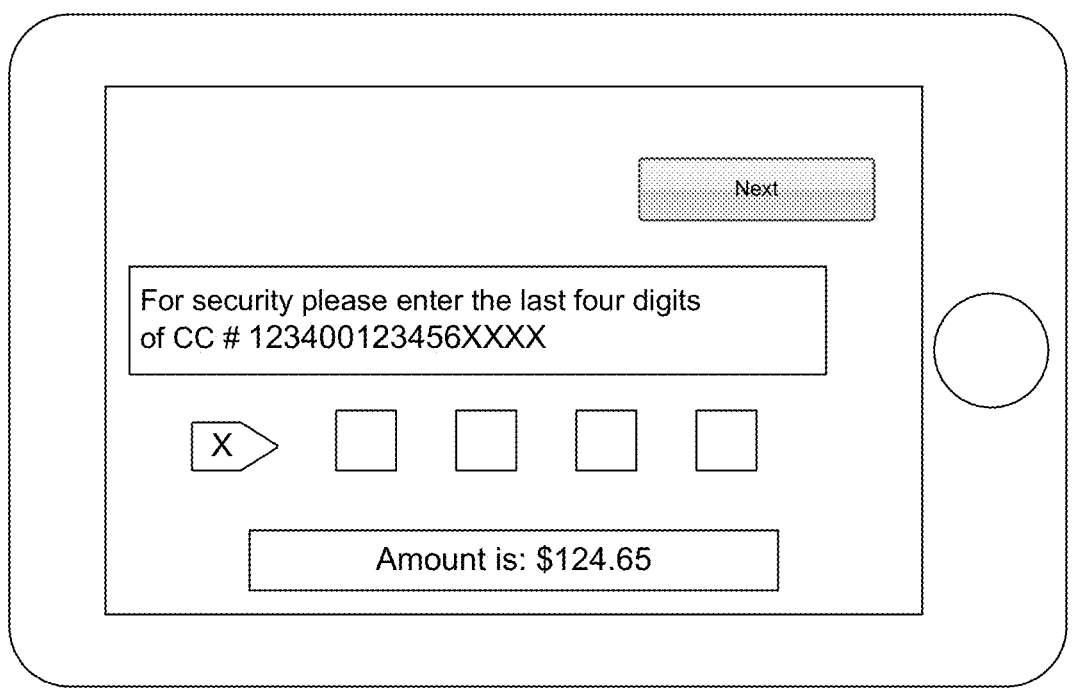
FIG. 9 illustrates an exemplary authentication user interface that can be displayed on a client computing device to perform user authentication.

FIG. 9 illustrates how server system 101 can require authentication prior to providing a signature user interface to client computing device 103. For example, after the user selects the link included in the message (e.g. text message 301), server system 101 can cause authentication user interface 900 to be displayed to the user. Authentication user interface 900 can include sufficient information to identify the transaction for which the user is providing his signature.

Authentication user interface 900 can prompt the user to provide authenticating information to authenticate the user. As shown, authentication user interface 900 can prompt the user to provide the last four digits of the routing number of the user's checking account. Other types of authenticating information can also be requested such as other account information (e.g. a pin, last four digits of credit card number, a portion of a tracking number for a package, etc.), personal information (e.g. the user's birth date or social security number), etc.

Authentication user interface 900 can provide the benefit of ensuring that the user receiving the message from server system 101 is the intended recipient. For example, if the employee of the merchant input appropriate account information into fields 201 of user interface 200, but mistyped the phone number or email address into fields 202, 203 (thereby causing the message to be sent to an incorrect recipient), authentication user interface 900 can successfully prevent an unintended recipient from authorizing a transaction.

Server system 101 can be configured to notify merchant computing system 102 of a failure in the authentication process to allow the merchant to verify the information input to user interface 200 and resend a request if necessary. For example, the failure notification can be sent after a specified number of failed attempts by the user to input appropriate information to authentication user interface 900, after a specified duration of time without receiving authentication information, etc.

In some embodiments, authentication user interface 900 can also include means for the user to notify merchant computing system 102 that the signature request has been sent to the incorrect user or that the displayed information is incorrect. For example, a button, field, or other user interface element can be included that allows a user to send a notification back to merchant computing system 102 without providing a signature.

In some embodiments, to facilitate the use of the present invention, user interface 400 for receiving a user signature and authentication user interface 900 for authenticating a user can be provided within a standard web browser. In other words, these user interfaces can be browser based such that no additional hardware or software is required to be installed on client computing device 103 to provide a signature remotely.

To enhance the security of the user's information and signature, the present invention can employ encryption techniques to secure the information transmitted between the various computing systems. For example, the signature captured by client computing device 103 can be transmitted securely from client computing device 103 to server system 101 such as by using HTTPS or another secure protocol. Also, the signature or other user information can be stored on server system 101 as a secure token using AES 256 encryption or another type of encryption.

Accordingly, the present invention facilitates obtaining a signature from a remote user. Any network connected client computing device having a touch screen and a browser can be used to provide a signature remotely to authorize a transaction. In this manner, a signature can be provided for transactions requiring a signature as well as for transactions were a signature is desired but not required.

By providing a browser based solution for obtaining a signature, no additional software or hardware is required to be installed on a client computing device. For example, a typical client computing device can receive a text message or email which provides a link to a web page in which the signature can be input.

The present invention further simplifies the signature obtaining process by providing an interface (e.g. a SOAP interface) that any third party merchant can access to send requests for signatures. In other words, if a merchant desires to obtain signatures from remote users over the internet, the merchant need only adapt its business processes to the interface provided by server system 101 to make and receive appropriate SOAP requests and responses. Of course, SOAP is one particular way of implementing the present invention, but other protocols could also be used in a similar manner.

Figure 10:
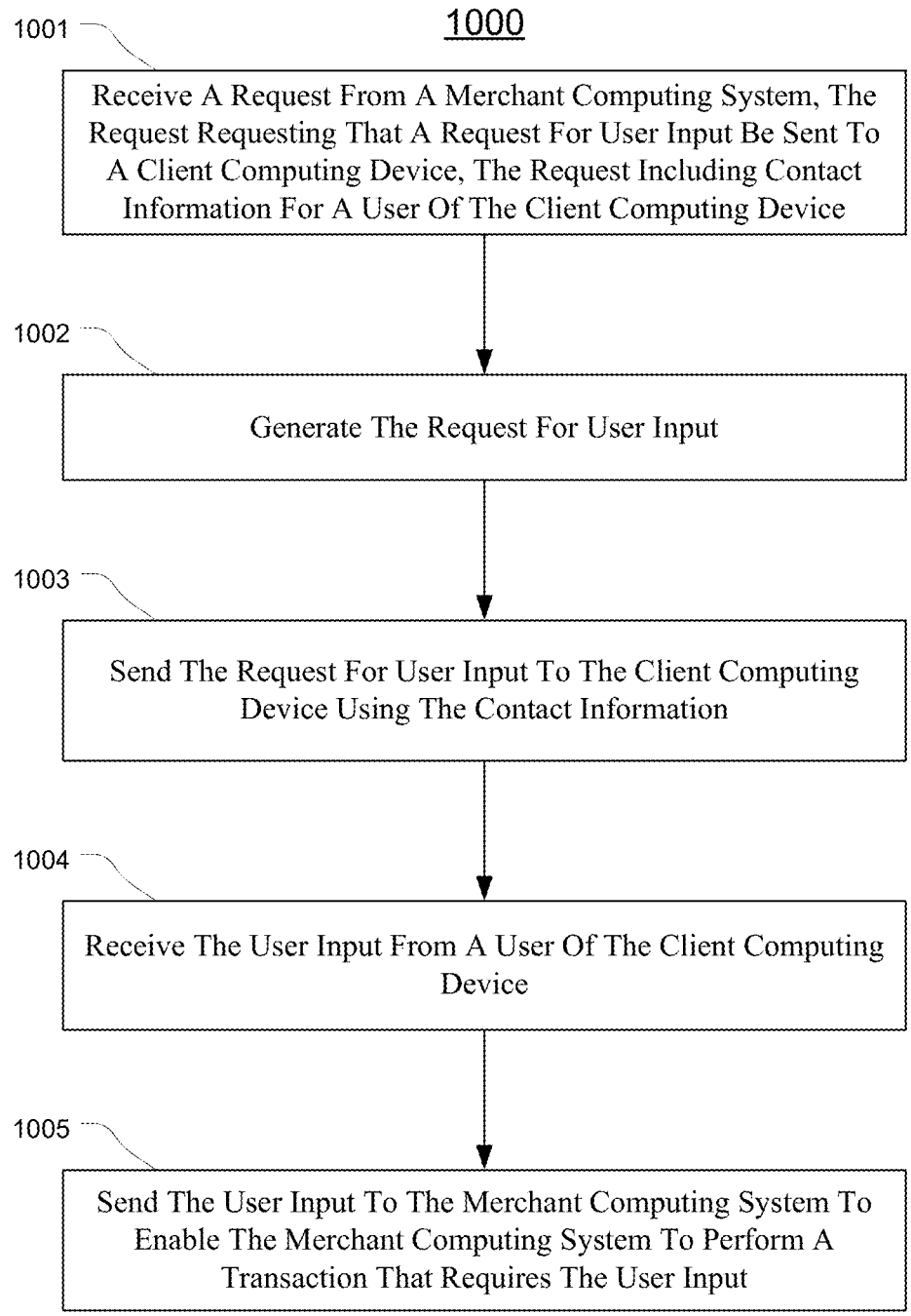
FIG. 10 illustrates a flowchart of an exemplary method for providing a request for user input to a client computing device over a network.

FIG. 10 illustrates a flowchart of an exemplary method 1000 for providing a request for user input to a client computing device over a network. Method 1000 can be performed by a server computing system that can communicate with a user's computing device.

Method 1000 includes an act 1001 of receiving a request from a merchant computing system, the request requesting that a request for user input be sent to a client computing device, the request including contact information for a user of the client computing device. For example, server system 101 can receive a request from merchant computing system 102 that includes contact information for sending a signature request to a user using client computing device 103.

Method 1000 includes an act 1002 of generating the request for user input. For example, server system 101 can generate a signature request.

Method 1000 includes an act 1003 of sending the request for user input to the client computing device using the contact information. For example, server system 101 can email, text, or otherwise send a link to client computing device 103.

Method 1000 includes an act 1004 of receiving the user input from a user of the client computing device. For example, server system 101 can receive the user's signature.

Method 1000 includes an act 1005 of sending the user input to the merchant computing system to enable the merchant computing system to perform a transaction that requires the user input. For example, server system 101 can send the user's signature to merchant computing system 102 to enable merchant computing system 102 to perform a financial transaction.

Figure 11:
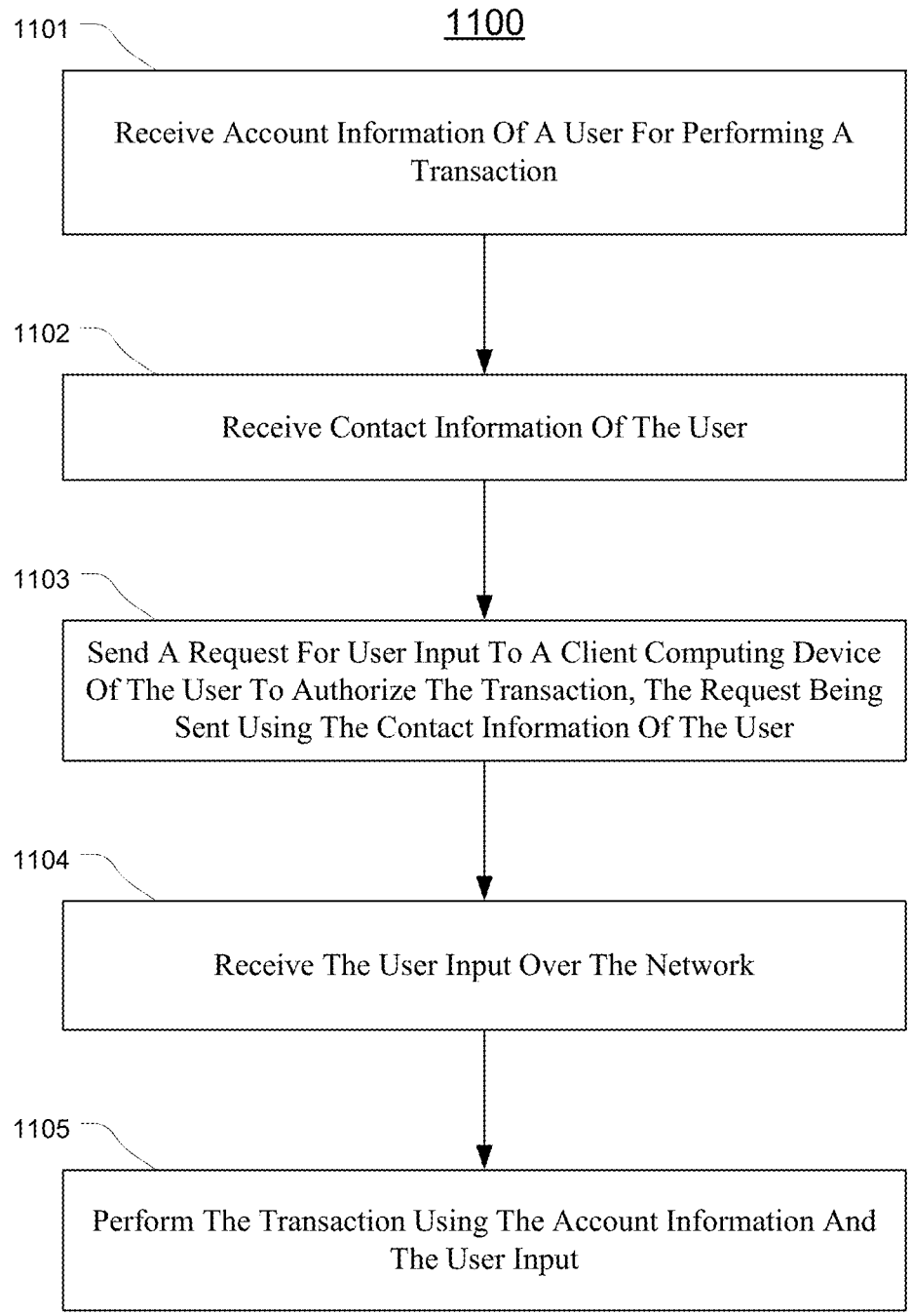
FIG. 11 illustrates a flowchart of an exemplary method for requesting user input from a remote user over a network.

FIG. 11 illustrates a flowchart of an exemplary method 1100 for requesting user input from a remote user over a network. Method 1100 can be performed by a merchant computing system that can communicate with a user's computing device via a server system.

Method 1100 includes an act 1101 of receiving account information of a user for performing a transaction. For example, merchant computing system 102 can receive account information for a transaction to be entered into with a user of client computing device 103.

Method 1100 includes an act 1102 of receiving contact information of the user. For example, merchant computing system 102 can receive contact information for communicating with client computing device 103.

Method 1100 includes an act 1103 of sending a request for user input to a client computing device of the user to authorize the transaction, the request being sent using the contact information of the user. For example, merchant computing system 102 can send a request, via server system 101, to client computing device 103 using the contact information.

Method 1100 includes an act 1104 of receiving the user input over the network. For example, merchant computing system 102 can receive the user's signature via server system 101.

Method 1100 includes an act 1105 of performing the transaction using the account information and the user input. For example, merchant computing system 102 can perform a credit card transaction using the user's signature as authorization.

Figure 12:
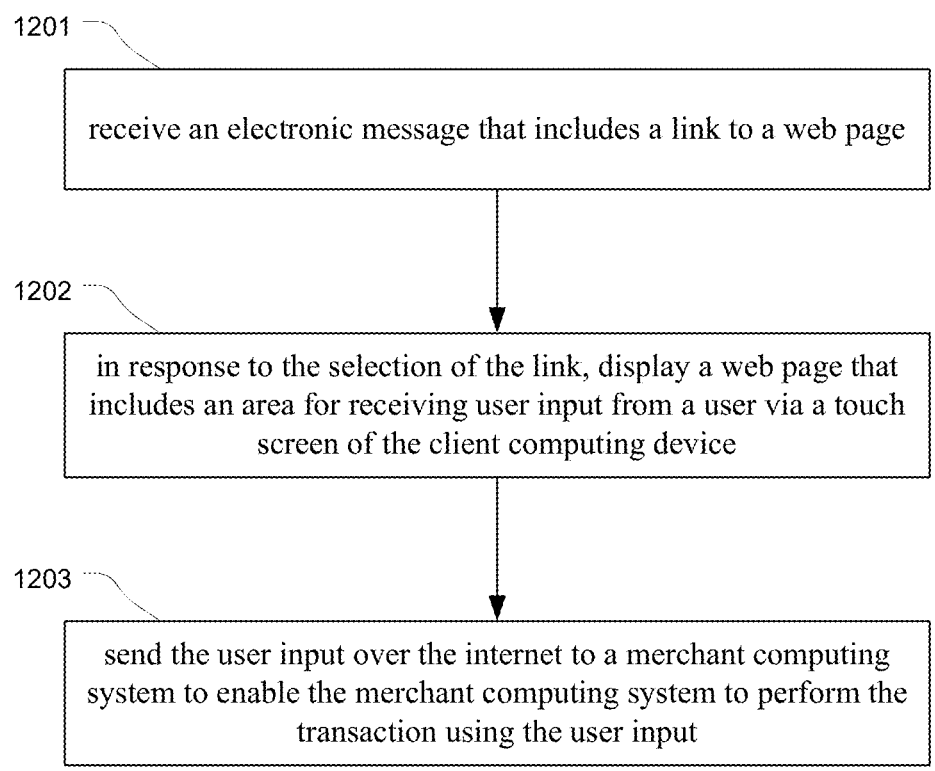
FIG. 12 illustrates a flowchart of an exemplary method for remotely providing user input to authorize a transaction.

FIG. 12 illustrates a flowchart of an exemplary method 1200 for remotely providing user input to authorize a transaction. Method 1200 can be performed by a client computing device that can communicate with a server system.

Method 1200 includes an act 1201 of receiving an electronic message that includes a link to a web page. For example, client computing device 103 can receive a text message that includes a link to a web page having an area to input a user's signature.

Method 1200 includes an act 1202 of in response to the selection of the link, displaying a web page that includes an area for receiving user input from a user via a touch screen of the client computing device. For example, when the user selects the link, a web page can be displayed by a browser on client computing device 103 that provides a signature area where the user can input a signature.

Method 1200 includes an act 1203 of sending the user input over the internet to a merchant computing system to enable the merchant computing system to perform the transaction using the user input. For example, client computing device 103 can send the user's signature to merchant computing system 102 via server system 101.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. In a server computing system, a method for enabling a plurality of merchant computing systems to obtain user input from users of a plurality of client computing devices without communicating with the client computing devices, the method comprising:

configuring the server computing system to function as an intermediary between a plurality of merchant computing systems and a plurality of client computing devices for the purpose of enabling the merchant computing systems to obtain user input from users of the client computing devices without communicating with the client computing devices, wherein configuring the server computing system to function as the intermediary includes configuring the server computing system to provide an interface to the plurality of merchant computing systems, the interface configured to receive communications from an application executing on each of the plurality of merchant computing systems, the server computing system comprising memory that stores computer executable instructions defining the interface and a processor that executes the computer executable instructions to provide the interface;

receiving, by the server computing system and via the interface, one or more first communications sent over the internet by the application executing on a first merchant computing system of the plurality of merchant computing systems, the one or more first communications including:
  (1) a request to obtain user input to serve as authorization for the first merchant computing system to perform a transaction to an account of a user,
  (2) contact information for the user, and
  (3) information representing the transaction;
wherein the server computing system receives the one or more first communications from the application executing on the first merchant computing system without the first merchant computing system communicating with any client computing device of the user;
  extracting, by the server computing system, the contact information and the information representing the transaction from the one or more first communications;
  generating, by the server computing system, a webpage that includes an input area for receiving the user input from the user;
  formatting, by the server computing system, the webpage to include the information representing the transaction that was provided in the one or more first communications;
  transmitting, by the server computing system and over a network, a second communication that targets a client computing device associated with the user based on the contact information that was provided in the one or more first communications, the server computing system transmitting the second communication without first communicating with the client computing device, the second communication including a link that the user can select, once the second communication is received by and displayed on the client computing device, to cause the webpage to be displayed on the client computing device;
  in response to the user selecting the link included in the second communication once the second communication is received by and displayed on the client computing device, communicating, by the server computing system, directly with the client computing device including transmitting the webpage to the client computing device such that the webpage is displayed to the user to allow the user to provide the user input into the input area;
  in response to the user providing the user input, further communicating, by the server computing system, directly with the client computing device including receiving, from the client computing device, one or more third communications that include the user input; and
  in response to receiving the one or more third communications, sending, by the server computing system, the user input to the first merchant computing system such that the first merchant computing system receives the user input without communicating with the client computing device, the receipt of the user input enabling the first merchant computing system to associate the user input with the account for the user on the first merchant computing system such that the user input can serve as authorization from the user to perform the transaction to the account.

2. The method of claim 1, wherein the account includes one or more of:
  a checking account such that the user input serves as authorization from the user to deduct an amount from an associated checking account; or
  a credit card account such that the user input serves as authorization from the user to charge an amount to an associated credit card account.

3. The method of claim 1, wherein the user input comprises:
  a signature;
  a PIN; or
  a confirmation.

4. The method of claim 1, wherein, in response to the user selecting the link in the second communication, the server computing system communicates directly with the client computing device to presents the user with a request to authenticate prior to providing the user input, the request to authenticate being presented in the webpage that includes the input area or in a separate webpage that is provided prior to the webpage that includes the input area.

5. The method of claim 4, wherein the request for the user to authenticate is presented in a separate webpage, wherein the separate webpage includes a first portion of the information representing the transaction and requests that the user confirm a second portion of the information representing the transaction that is not included in the separate webpage.

6. The method of claim 1, wherein the contact information comprises:
  a phone number;
  an email address;
  an instant message; or
  a social networking account address.

7. The method of claim 1, wherein the input area of the webpage is configured to receive the user input via one or more of:
  a touch screen of the client computing device; or
  an input device configured to detect user input and provide the user input to the client computing device.

8. The method of claim 1, wherein the transaction comprises a delivery of a package and the user input serves as authorization for the merchant to leave the package at the user's home.

9. The method of claim 1, wherein the one or more first communications from the merchant computing system comprises a batch request that includes:
  (1) multiple requests to obtain user input,
  (2) contact information for each of the multiple requests, and
  (3) information representing a transaction associated with each of the multiple requests.

10. One or more non-transitory computer storage media storing computer executable instructions which when executed by one or more processors perform a method for enabling a plurality of merchant computing systems to obtain user input from users of a plurality of client computing devices without communicating with the client computing devices, the method comprising:
  configuring the server computing system to function as an intermediary between a plurality of merchant computing systems and a plurality of client computing devices for the purpose of enabling the merchant computing systems to obtain user input from users of the client computing devices without communicating with the client computing devices, wherein configuring the server computing system to function as the intermediary includes configuring the server computing system to provide an interface to a first merchant computing system, the interface configured to receive communications from an application executing on the first merchant computing system;

receiving, by the server computing system and via the interface, one or more first communications sent over the internet by the application executing on the first merchant computing system, the one or more first communications including:
- (1) a request to obtain user input to serve as authorization for the first merchant computing system to perform a transaction to an account of a user,
- (2) contact information for the user, and
- (3) information representing the transaction, wherein the server computing system receives the one or more first communications from the application executing on the first merchant computing system without the first merchant computing system communicating with any client computing device of the user;

extracting, by the server computing system, the contact information and the information representing the transaction from the one or more first communications;

generating, by the server computing system, a webpage that includes an input area for receiving the user input from the user;

formatting, by the server computing system, the webpage to include the information representing the transaction that was provided in the one or more first communications;

transmitting, by the server computing system and over a network, a second communication that targets a client computing device associated with the user based on the contact information that was provided in the one or more first communications, the server computing system transmitting the second communication without first communicating with the client computing device, the second communication including a link that the user can select, once the second communication is received by and displayed on the client computing device, to cause the webpage to be displayed on the client computing device;

in response to the user selecting the link included in the second communication once the second communication is received by and displayed on the client computing device, communicating, by the server computing system, directly with the client computing device including transmitting the webpage to the client computing device such that the webpage is displayed to the user to allow the user to provide the user input into the input area;

in response to the user providing the user input, further communicating, by the server computing system, directly with the client computing device including receiving, from the client computing device, one or more third communications that include the user input; and in response to receiving the one or more third communications, sending, by the server computing system, the user input to the first merchant computing system such that the first merchant computing system receives the user input without communicating with the client computing device, the receipt of the user input enabling the first merchant computing system to associate the user input with the account for the user on the first merchant computing system such that the user input can serve as authorization from the user to perform the transaction to the account.

11. The one or more non-transitory computer storage media of claim 10, wherein the account comprises a checking account, and the user input serves as authorization to deduct an amount from the checking account.

12. The one or more non-transitory computer storage media of claim 11, wherein the authorization is an authorization to deduct the amount from the checking account on a periodic basis.

13. The one or more non-transitory computer storage media of claim 10, wherein the account comprises a credit card account, and the user input serves as authorization to charge an amount to the credit card account.

14. The one or more non-transitory computer storage media of claim 13, wherein the authorization is an authorization to charge the amount to the credit card account on a periodic basis.

15. The one or more non-transitory computer storage media of claim 10, wherein, in response to the user selecting the link in the second communication, the server computing system communicates directly with the client computing device to present the user with a request to authenticate prior to providing the user input, the request to authenticate being presented in the webpage that includes the input area or in a separate webpage that is provided prior to the webpage that includes the input area.

16. The one or more non-transitory computer storage media of claim 15, wherein the request for the user to authenticate is presented in a separate webpage, wherein the separate webpage includes a first portion of the information representing the transaction and requests that the user confirm a second portion of the information representing the transaction that is not included in the separate webpage.

17. The one or more non-transitory computer storage media of claim 10, wherein the method further comprises:

receiving, by the server computing system and via the interface, one or more additional first communications sent over the internet by an application executing on a second merchant computing system of the plurality of merchant computing systems, the one or more additional first communications including:
- (1) a request to obtain user input to serve as authorization for the second merchant computing system to perform a transaction to an account of a second user,
- (2) contact information for the second user, and
- (3) information representing the transaction to the account of the second user;

wherein the server computing system receives the one or more additional first communications from the application executing on the second merchant computing system without the second merchant computing system communicating with any client computing device of the second user;

extracting, by the server computing system, the contact information and the information representing the transaction from the one or more additional first communications;

generating, by the server computing system, an additional webpage that includes an input area for receiving the user input from the second user;

formatting, by the server computing system, the additional webpage to include the information representing the transaction that was provided in the one or more additional first communications;

transmitting, by the server computing system and over a network, an additional second communication that targets a second client computing device associated with the second user based on the contact information that was provided in the one or more additional first communications, the server computing system transmitting the additional second communication without first communicating with the second client computing device, the additional second communication including a link that the second user can select, once the additional second communication is received by and displayed on the second client computing device, to cause the additional webpage to be displayed on the second client computing device;

in response to the second user selecting the link included in the additional second communication once the additional second communication is received by and displayed on the second client computing device, communicating, by the server computing system, directly with the second client computing device including transmitting the additional webpage to the second client computing device such that the additional webpage is displayed to the second user to allow the second user to provide the user input into the input area;

in response to the second user providing the user input, further communicating, by the server computing system, directly with the second client computing device including receiving, from the second client computing device, one or more additional third communications that include the user input; and in response to receiving the one or more additional third communications, sending, by the server computing system, the user input to the second merchant computing system such that the second merchant computing system receives the user input without communicating with the second client computing device, the receipt of the user input enabling the second merchant computing system to associate the user input with the account for the second user on the second merchant computing system such that the user input can serve as authorization from the second user to perform the transaction to the account of the second user.

18. In a server computing system, a method for enabling a plurality of merchant computing systems to obtain user input from users of a plurality of client computing devices without communicating with the client computing devices, the method comprising:

configuring the server computing system to function as an intermediary between a plurality of merchant computing systems and a plurality of client computing devices for the purpose of enabling the merchant computing systems to obtain user input from users of the client computing devices without communicating with the client computing devices, wherein configuring the server computing system to function as the intermediary includes configuring the server computing system to provide an interface to the plurality of merchant computing systems, the interface configured to receive communications from an application executing on each of the plurality of merchant computing systems, the server computing system comprising memory that stores computer executable instructions defining the interface and a processor that executes the computer executable instructions to provide the interface;

receiving, by the server computing system and via the interface, one or more first communications sent over the internet by the application executing on a first merchant computing system of the plurality of merchant computing systems, the one or more first communications including:

(1) a request to obtain user input to serve as authorization for the first merchant computing system to perform a transaction to an account of a user,
(2) contact information for the user, and
(3) information representing the transaction;

wherein the server computing system receives the one or more first communications from the application executing on the first merchant computing system without the first merchant computing system communicating with any client computing device of the user;

extracting, by the server computing system, the contact information and the information representing the transaction from the one or more first communications;

generating, by the server computing system, a webpage that includes an input area for receiving the user input from the user;

formatting, by the server computing system, the webpage to include the information representing the transaction that was provided in the one or more first communications;

transmitting, by the server computing system and over a network, a second communication that targets a client computing device associated with the user based on the contact information that was provided in the one or more first communications, the server computing system transmitting the second communication without first communicating with the client computing device, the second communication including a link that the user can select, once the second communication is received by and displayed on the client computing device, to cause the webpage to be displayed on the client computing device;

in response to the user selecting the link included in the second communication once the second communication is received by and displayed on the client computing device, communicating, by the server computing system, directly with the client computing device including:

presenting the user with a request to authenticate prior to providing the user input; and in conjunction with authenticating the user, transmitting the webpage to the client computing device such that the webpage is displayed to the user to allow the user to provide the user input into the input area;

in response to the user providing the user input, further communicating, by the server computing system, directly with the client computing device including receiving, from the client computing device, one or more third communications that include the user input; and in response to receiving the one or more third communications, sending, by the server computing system, the user input to the first merchant computing system such that the first merchant computing system receives the user input without communicating with the client computing device, the receipt of the user input enabling the first merchant computing system to associate the user input with the account for the user on the first merchant computing system such that the user input can serve as authorization from the user to perform the transaction to the account.

19. The method of claim 18, wherein the request for the user to authenticate is presented in a separate webpage.

20. The method of claim 19, wherein the separate webpage includes a first portion of the information representing the transaction and requests that the user confirm a second portion of the information representing the transaction that is not included in the separate webpage.

* * * * *